Patented Oct. 16, 1928.

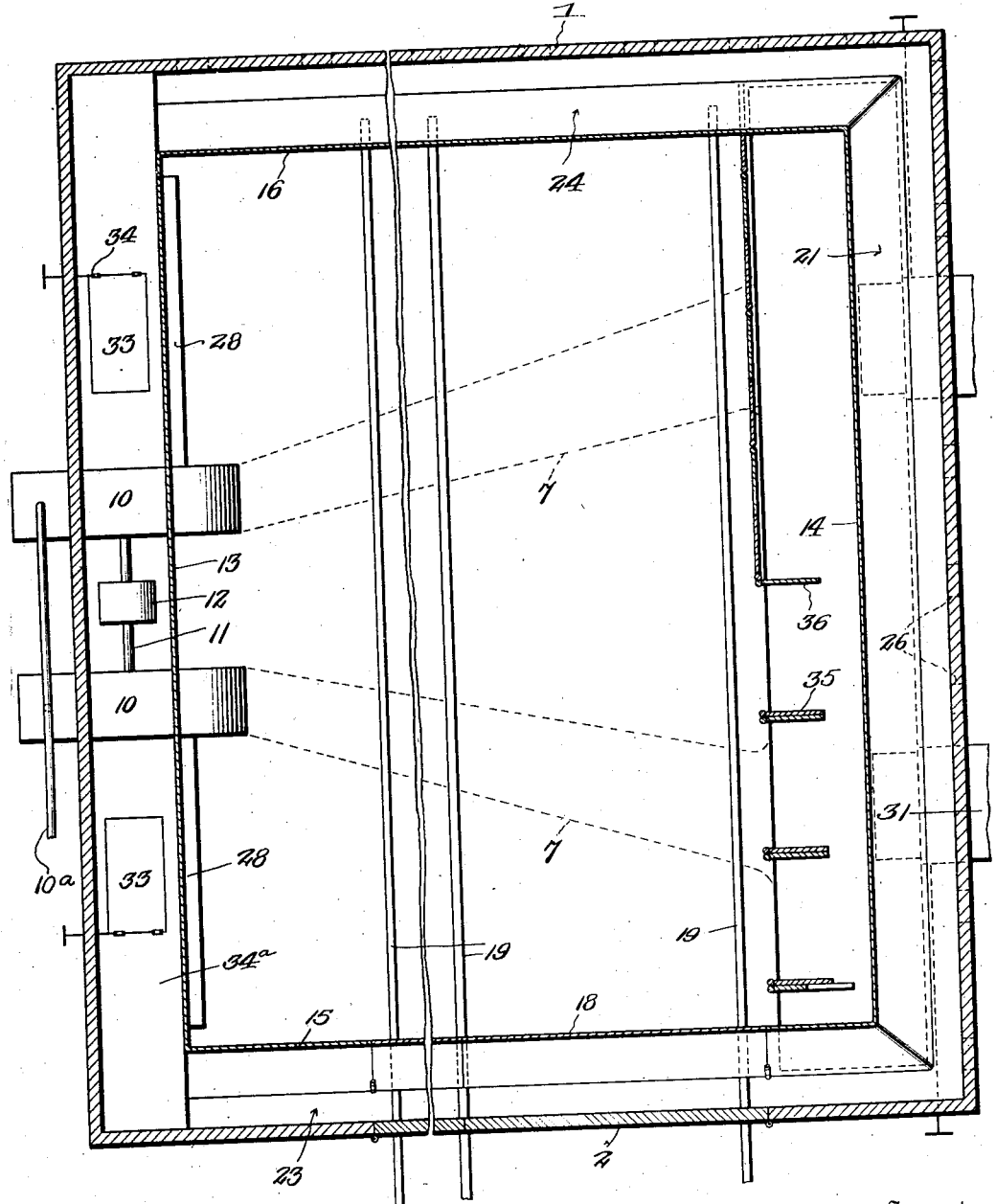
Fig.3.
Fig.4.
Inventor
H.C.Babel,
By
Attorney

1,687,822

UNITED STATES PATENT OFFICE.

HENRY CLAY BABEL, OF BUFFALO, NEW YORK, ASSIGNOR TO MYRTLE L. BABEL, OF BUFFALO, NEW YORK.

PROCESS AND APPARATUS FOR REMOVING CHEMICALS AND MOISTURE FROM LUMBER, WOOD, AND OTHER SUBSTANCES.

Application filed January 5, 1925. Serial No. 647.

The present invention relates to an improved process and apparatus for removing both the deleterious chemicals and the water or moisture from lumber, wood and other substances, particularly valuable hardwoods, and in the case of lumber, without the attendant dangers of surface and end checking, warping, case hardening, hollow horning, honeycombing or otherwise injuring the materials in the slightest degree.

One of the primary objects of the present invention is to provide simple, inexpensive, readily available and easily operable metallic retorts in which to de-chemicalize and dry lumber, wood and other substances, the said retorts to be located within simple and inexpensive outer enclosures without the necessity of blasting or other expensive excavations, the construction of costly cement, stone or brick basements, in which to install expensive heating and condensing coils or an aggregation of equally expensive radiators which in winter are liable to freeze and burst and thereby render the equipment useless temporarily at least.

Another object of the invention is to provide simple and absolutely positive means for controlling the circulation within the metallic retorts, of live steam used to treat and de-chemicalize the lumber and other material before and during the drying operations, as well as to provide simple and equally positive means for controlling the heated and humidified air within the metallic retorts, during the drying operations.

It is also an important object of the invention to provide simple, positive and absolutely automatic means for the continuous and uniform elimination of the chemical composition and moisture during the drying operations, combined with equally simple yet absolutely positive and automatic substitution for the eliminated chemical composition and moisture, of dry preheated air into the metallic retorts to sustain the otherwise falling temperature, thereby maintaining the capacity of the circulating medium to absorb and carry away efficiently, said exuding chemical composition and moisture.

Another important object of the invention is to provide treating and drying retorts and outer enclosures of such relative shape and proportions as will afford suitable heat radiation chambers or spaces on two or more sides of and partly above the retorts in which to collect automatically and conserve for use, as required, the dry heat radiated by the retorts or their contents; said chambers or spaces to be connected and arranged in such relation to the circulation within the metallic treating and drying retorts as will cause the waste heat in the form of hot air to automatically take the place of the chemical composition and moisture which is being trapped off and eliminated from the circulation.

Another important object of the invention is to provide simple means for the expeditious cooling of the lumber or other material de-chemicalized and dried so as to make it quickly available for shipment or fabrication, thereby avoiding the loss of as many days in the so-called cooling shed as hours are required to restore the normal temperature of the materials by the present invention, which result is accomplished by turning off the steam from the heater and operating the fans for a few hours after the conclusion of the drying operations.

Thus far, live steam has been found to be the simplest and most available solvent for the crystal and semi-crystal chemicals inherent in all fibrovascular structures and it also serves to open up and temporarily enlarge the cells and arterial channels to facilitate the speedy removal of the deleterious chemicals and moisture but the treatment must reach the innermost cells of the thickest boards even when frozen in winter and in the center of the pile, hence it will not be sufficient to introduce steam into the drying chamber merely to play around the edges or outside of the lumber pile or other substances and to condense before it can find its way into the sticker spaces or openings between the several layers of material, without even adequate means for removing the additional moisture thus precipitated.

The present invention accomplishes the desired result perfectly, positively and with an unprecedented rate of speed without the slightest damage to the lumber or other materials and yet at a temperature nearly 100 degrees lower than is deemed essential by some drying experts who do not seem to realize that undue shrinkage is inevitable with excessive high temperatures and in some of the most valuable lumber species, partial or total collapse of the cell structure ensues at the extreme temperatures, partially or totally destroying the value of the lumber.

In the present invention, live steam is preferably introduced through a double blower located centrally at one of the longitudinal sides of the lumber pile and in the case of dechemicalizing and drying lumber, with the base thereof sufficiently below the floor line to conceal the greater part or all of the discharge openings and by means of underground ducts, extending transversely across the floor area into a distributing chamber, the only outlet for which is the sticker spaces or openings between the several layers of lumber or other material to be dechemicalized and dried, with the opposite ends of the openings or sticker spaces so disposed and related to the suction openings on the sides of the double blower that the movement of all steam and thereafter properly heated and humidified air may be likened to a series of endless currents being literally pulled through all of the openings in the stack of material with the further advantage of being pushed through from the other side by the blower fans, making the action absolutely uniform and positive and precluding the escape of the circulating medium, as the pull is exactly equal to the push and the only route of travel through the lumber or other material, there to penetrate the fibrovascular structure, dissolve the deleterious chemicals and later carry away the exuding chemical composition and moisture.

In this positive and efficient manner, the present invention heats, humidifies and circulates air to every portion of the exposed surface of the material, except in the case of lumber where the ends are purposely shielded to prevent end checking, as the exudation is more prolific at the ends of the sap canals and end checking is inevitable unless the treatment is modified in this manner.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Figure 3 is a horizontal sectional view of the lumber drier.

Figure 4 is a detailed sectional view illustrating the construction of the hollow insulated walls.

Figure 1:
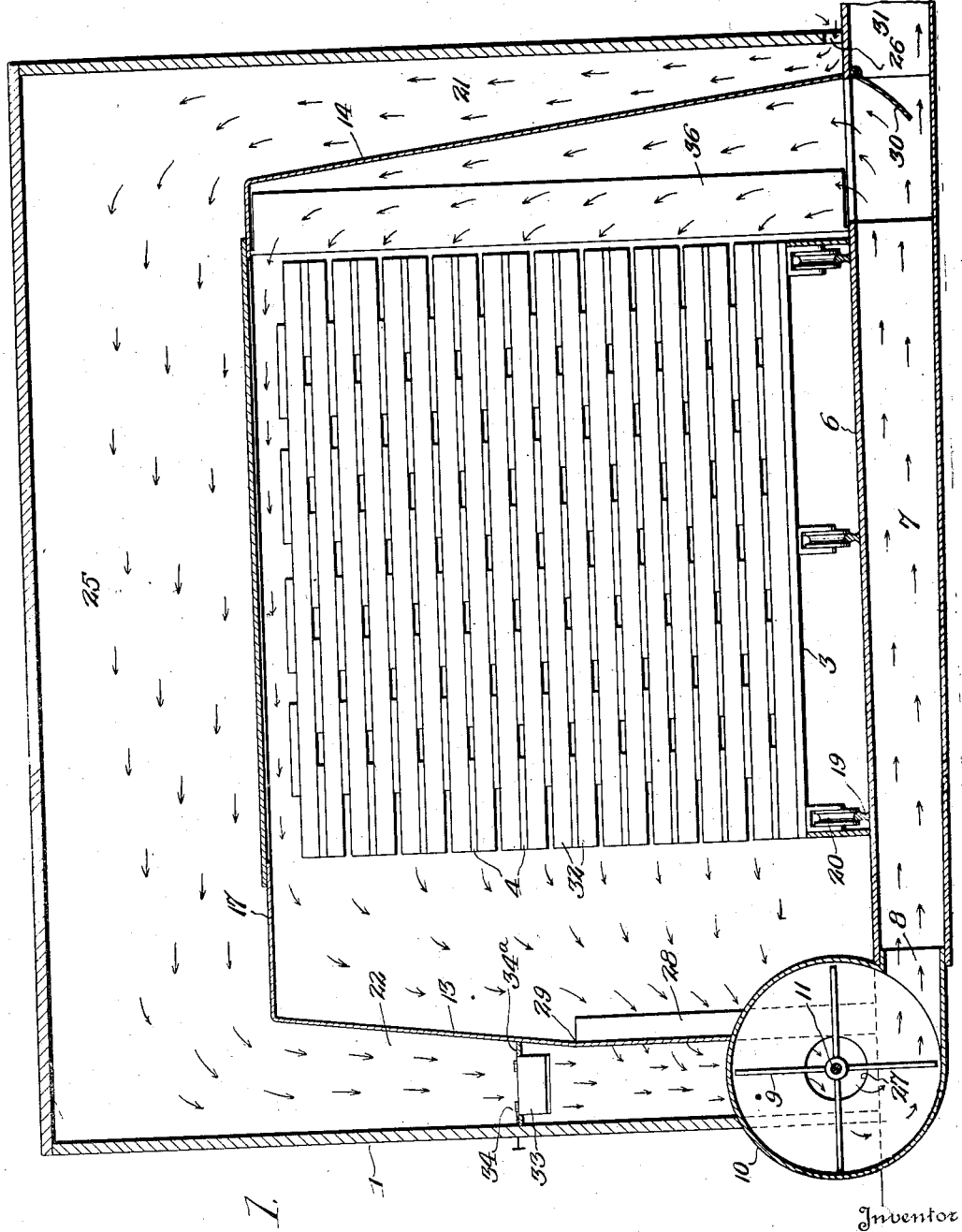
Fig. 1 is a transverse sectional view of a lumber drier constructed in accordance with this invention.

In the accompanying drawings is illustrated one form of apparatus for carrying out the present invention.

The lumber drier comprises in its construction an outer casing 1 having vertical walls and an approximately horizontal roof or ceiling and provided at the front with suitable hinged doors 2 for the entrance and removal of a truck 3 upon which the lumber 4 or other material is stacked for drying as clearly shown in the accompanying drawings. Unless statutes or ordinances require fire resisting materials, a frame outer enclosure of suitable size made of two by six wood studding and roof joists and covered with ordinary matched sheeting inside and out, the hollow walls being filled with sawdust, mineral wool or any other suitable material, will answer as effectively as the most costly fireproof structure, as combustion is practically impossible where live steam is available at a moment's notice and with ample means for circulating the same throughout the drying area.

No expensive blasting of rock or other excavations are required, neither costly cement, stone or brick basements. A frame superstructure may be built in stationary as well as in portable form to make it readily available particularly in remote locations where the costly equipments now upon the market cannot be considered and the said superstructure may rest upon inexpensive mud-sills 5 embedded in the surface of the ground. The floor 6 may consist of heavy boards or mill-culls laid on wood stringers also embedded in the surface of the ground after two diverging ducts 7 gradually increasing in cross section and toward the outlet have been built of wood or other material leading from blower discharge openings 8 and arranged directly beneath the floor and extending from one side of the retort to the opposite side thereof, the floor boards in inexpensive constructions serving as the tops of said ducts. The ducts 7 preferably have horizontal top walls, inclined bottom walls and diverging side walls to decrease static resistance.

The double blower which is located at one side of the apparatus is composed of two fans 9, arranged in suitable casings 10 and preferably mounted on a common shaft 11 which is driven by a suitable power, a pulley 12 being shown in the shaft between the blowers as a power connection. The fans may extend through the side of the frame work as shown in Fig. 3. The retort is composed of side walls 13 and 14, front and rear walls 15 and 16, and a top wall 17, all constructed of metal. The side and rear wall are preferably composed of stationary plates and the top wall is designed to be removable while the front wall is provided with suitable doors 18 to enable the truck 3 carrying the material to be run into and out of the retort on rails 19. The rails 19 are preferably three in number as shown and the truck is equipped with grooved wheels 20 to run on the rails but any other desired number of wheels and rails may, of course, be provided, as will be readily understood. The side walls and the front and rear walls of the retort are preferably inwardly inclined and converge upwardly as shown to form intervening side spaces or passages 21 and 22 and front and rear spaces or passages 23 and 24 between the retort and the walls of the enclosing structure. The metallic walls of the retort operate as heat radiating plates and radiate the heat from the interior of the retort into the side and overhead spaces 25 between the walls of the retort and the walls and ceiling or roof of the enclosing structure. Cold air or atmospheric air is admitted into the said spaces or passages surrounding the retort through air inlet openings 26 located at the surface of the ground and arranged at the front, back and the side of the superstructure opposite that at which the double blower is located. The eyes or inlets 27 of the fans of the blowers communicate with the space or passage 22 and are located adjacent to radiators 28 mounted in openings 29 in the wall 13 of the metallic retort. The diverging ducts 7, which are located below the floor of the retort extend from the discharge openings 8 of the blowers to the opposite side of the retort and they are equipped at the latter side of the retort with curved deflecting doors or valves 30 preferably hinged at their upper edges as shown and presenting concave faces to the currents passing through the said ducts 7 and adapted to have their lower or free edges arranged in spaced relation with the bottom of the ducts to permit a portion of the said currents to discharge through exhaust passages or ducts 31.

Figure 2:
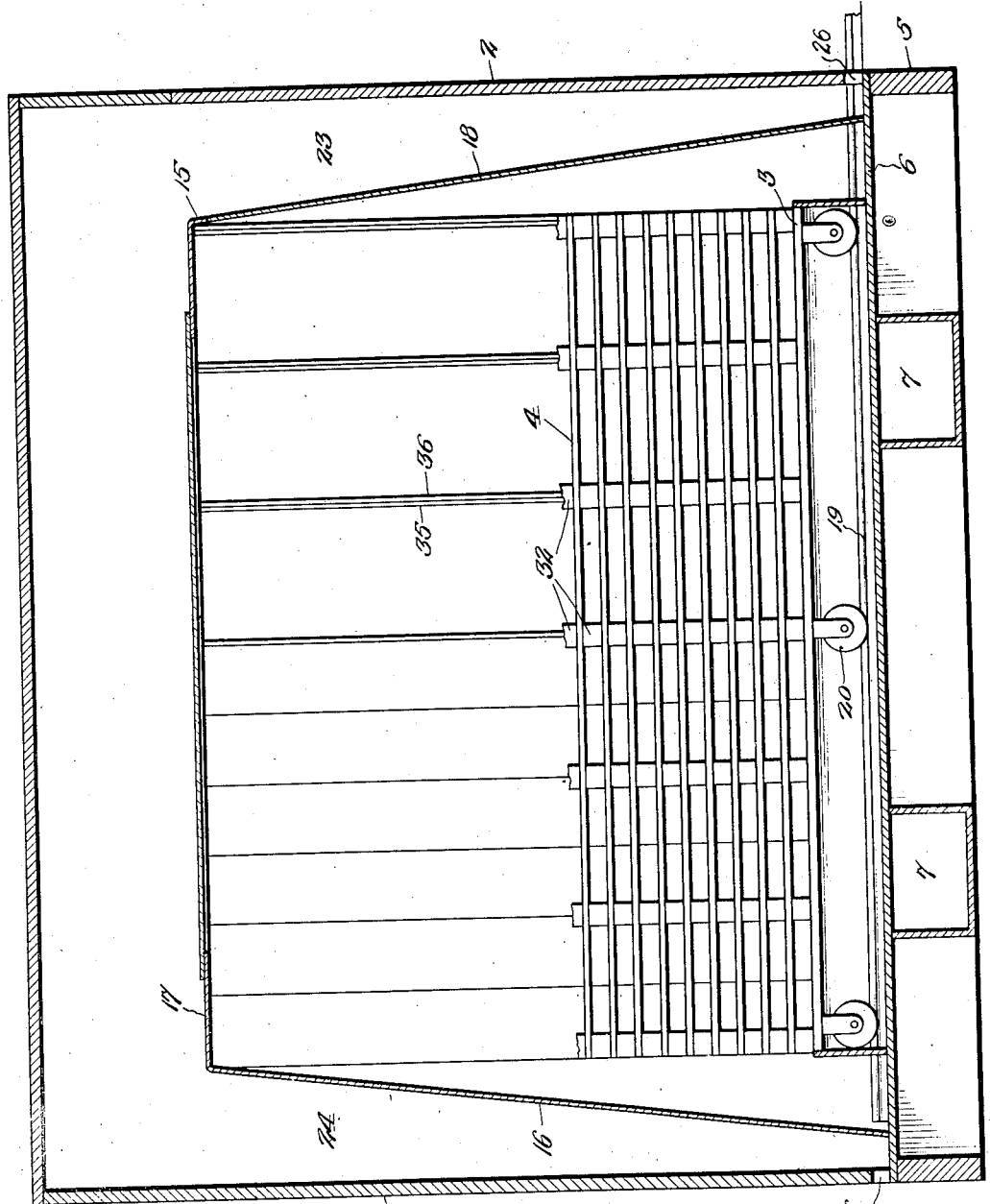
Fig. 2 is a longitudinal sectional view of the same.

The lumber or other material to be dried is arranged upon the truck in horizontal layers spaced apart by stickers 32 to form spaces or passages between the said layers as clearly shown in Figures 1 and 2 of the drawings. Live steam is introduced into the fans of the double blower by the pipe 10ª and passes along the diverging ducts 7 and then upward into the retort as indicated by the arrows in Fig. 1 of the drawings. The upwardly inclined side 14 will direct the live steam into the passages or spaces between the layers of the material to be dried or dechemicalized and the material will be thoroughly subjected to the action of the live steam which will pass out of the retort through the radiators 28. The live steam with the vapors exuded from the lumber or other material will be drawn into the eyes of the fans and will again pass through the diverging passages or ducts 7, the heavier moisture laden portions seeking the bottom of the ducts 7 and passing out through the spaces between the lower edges of the valves 30 and the bottom walls or floors of the ducts and discharging at the exhaust openings 31. The heat of the live steam circulating through the retort, is radiated into the spaces or passages surrounding the retort and the air contained in the said spaces or passages is heated and a portion of the same passes downward through the space or passage 22 and is drawn into the drying currents passing into the eyes of the fan to take the place of the volumes of moisture laden steam and air discharged through the exhaust openings 31. As the moisture laden steam and air discharges at the exhaust 31, the dry hot air from the intervening spaces surrounding the retort will be automatically drawn into the eyes of the fan to take the place of the exhausted moisture laden steam and air. The passage 22 is equipped with gates or valves 33 hinged at one edge at 34 to a horizontal partition 34ª located in space 22 above the blowers and extending downwardly from the partition 34ª toward the eyes of the blowers to direct the heated air to the fan openings. Any suitable means may be provided for adjusting the valves or gates 30 and 33 and for securing the same in their adjustment and by means of such adjustment, the amount of the discharge vapor and the amount of dry air introduced into the circulatory system may be controlled.

The suction openings or eyes in the sides of the double blower are located near the floor and against the adjacent side wall of the enclosing structure, in a single unit in such a position as to divide equally the treating and drying space and afford each side of the double blower an equal volume of the circulating medium as well as an equal amount of work to perform in circulating the said medium. The radiators are installed directly in front of the eyes or inlets of the suction fans and against the inner or retort side of the openings in the metallic wall 13. The radiators which are heated preferably by steam, completely fill or cover the said openings in the wall 13 causing all of the circulating medium to pass through them each time it is pushed and pulled through the lumber or other material in the retort, at approximately which point just outside of the retort walls there is also being intermingled with the circulating medium, the dry hot air collected and stored around and above the metallic treating and drying retort for the most effectual removal of the excreting chemical composition and moisture during the drying operations.

The apparatus while especially adapted for drying and treating lumber and similar material may be advantageously employed for drying any other desired material. In practice, the passages or spaces between the layers of lumber will extend transversely of the same as the sticker or spacing strips will be laid across the layers of lumber and the ends of the boards may thereby the protected without interfering with the free passage of the circulating medium through the material.

While the return ducts 7 are shown at the bottom of the retort, yet it will be readily understood that the return may be made at any other desired part of the apparatus.

In the operation of treating and drying lumber, the latter is first subjected to the action of live steam to dissolve and wash out the chemical compositions and during the operation of dissolving and washing out the said chemical compositions, portions of the circulating medium may be exhausted and live steam is preferably used to take the place of such trapped or discharged portions of the circulating medium. This step may be continued for a period of twelve hours more or less according to the condition of the lumber, and in winter when lumber is covered with ice and snow, three or four hours additional treatment may be required because of this condition.

After the treatment of the lumber with live steam, the latter is turned off and the radiators are relied on to furnish the necessary heat to maintain the circulating medium at the required temperature. In this second operation, the heated air from the intervening spaces between the retort and the outer enclosure is supplied to the circulating medium to take the place of the moisture laden portion of the medium exhausted and discharged from the return ducts.

After the moisture has been completely extracted from the lumber and the latter thoroughly dried, the heat is turned off and the lumber is subjected to the cooling action of the blowers which cause a gradual reduction in the temperature of the lumber until the same is reduced to normal, thereby enabling the lumber to be shipped and otherwise handled in a much less space of time than is required with the ordinary cooling sheds and without liability of damaging the lumber by exposing the same in a heated condition to the temperature of atmospheric air.

Owing to the use of the live steam as a circulating medium, and the arrangement of the steam pipes for discharging the live steam into the blowers, the drying and treating apparatus is rendered practically fire proof as the circulation of the live steam through the retort will extinguish within a very short time, any fire which might under any circumstances occur within the same, and for this reason, the apparatus has been officially approved by fire underwriters associations and may be installed in mills and other structures without increasing the fire insurance rate thereof.

In order to enable the drying operation to be controlled and rendered uniform throughout the lumber or other material, the retort is equipped at the inlet side with doors 35 and 36 adapted to cover to a greater or less degree, the passages through the material, and at the front and back thereof. The end doors are extended as clearly illustrated in Fig. 3 of the drawings to enable them to close the spaces between the lumber and the retort at the front and back of the same. These doors which are vertical are suitably hinged at the top and bottom by hinges having vertical pintles adapted to permit a horizontal swinging of the doors. The doors are designed to be constructed of cheap metal, and may or may not be used for covering the said passages between the material as conditions may require.

What is claimed is:

1. The herein described process of drying and treating material which consists in subjecting the material while in a retort to the action of a continuously forced circulating medium, causing the circulating medium to pass horizontally through the material from one side of the retort to the other and downward to the bottom of the retort and to return beneath the material, the medium making its complete circuit within the retort, and exhausting an entire lower stratum of the circulating medium at the bottom below the material while the circulating medium is returning to the latter to eliminate the moisture from the material at the lowest gravitational point at the level of said medium, and reheating the circulating medium after passage through the material and prior to the return of the circulating medium at the bottom of the retort.

2. The herein described process of drying and treating material, which consists in subjecting the material while in a retort arranged within an inclosure to the action of a continuously forced circulating medium, causing the circulating medium to pass horizontally through the material from one side thereof through the material at the opposite side to the and downward at the opposite side to the bottom of the material, the medium making its complete circuit within the retort, exhausting an entire lower stratum of the circulating medium at the bottom below the material while the circulating medium is returning to the latter to eliminate the moisture from the material at the lowest gravitational point in the travel of the said medium, simultaneously supplying dry preheated air to the circulating medium as the moisture is exhausted and reheating the circulating medium after passage through the material and prior to the return of the circulating medium at the bottom of the retort.

3. The herein described process of drying and treating material consisting of subjecting material in a closed retort to an endless forced circulation of steam for a period, then substituting hot air for the steam and continuously circulating the hot air in the retort and causing the hot air to pass horizontally through the material from one side of the same to the opposite side thereof and return beneath the material, the hot air making its complete circuit within the retort, exhausting a portion of the condensation at the bottom while the hot air is returning to the material to remove a portion of the moisture from the material, discharging the exhausted moisture from the retort, and reheating the hot air within the retort.

4. The herein described process of drying and treating material consisting in subjecting the material in a closed retort to an endless forced circulation of steam for a period, then substituting hot air for the steam and continuously circulating the hot air in the retort and causing the hot air to pass horizontally through the material from one side of the same to the opposite side thereof and returning the hot air beneath the material, the hot air making its complete circuit within the retort, exhausting a portion of the condensation at the bottom while the hot air is returning to the material to remove a portion of the moisture from the material, reheating the circulating medium within the retort, and simultaneously supplying preheated dry air to the hot air while the exhausted moisture is being discharged.

5. An apparatus of the class described comprising an outer enclosure, a metallic retort, means for supporting the material to be dried and treated in the retort and for providing passages through the material, means for circulating a drying and heating medium through the material from one side of the retort to the side and downward at the said other side and for returning the drying and heating medium beneath the retort to form a continuous circulation, said retort being provided at the bottom with an exhaust outlet, means for reheating the circulating medium after passage through the material, and means for exhausting a complete lower stratum of the circulating medium at the bottom of the apparatus and for discharging the said exhausted portion of the circulating medium at the exhaust outlet.

6. An apparatus of the class described comprising an outer enclosure, a metallic retort arranged within the enclosure in spaced relation with the same to provide intervening spaces or passages for collecting and heating air, means for supporting the material to be dried and treated in the retort and for providing passages through the material, means for circulating a drying and heating medium through the material from one side of the retort to the other side and downward at the said other side and for returning the drying and heating medium beneath the retort to form a continuous circulation, said retort being provided at the bottom with an exhaust outlet, means for reheating the circulating medium after passage of same through the material, and means for exhausting a portion of the circulating medium at the bottom of the apparatus and for discharging the said exhausted portion of the circulating medium at the exhaust outlet.

7. An apparatus of the class described including an outer casing, an inner retort arranged in spaced relation with the outer casing, the latter being provided at the bottom with air inlet openings, means for supporting the material to be dried in the retort and for providing passages through the material, means for passing a drying and heating medium through the material and for returning the medium beneath the material, means for exhausting a portion of the circulating medium below the material for the removal of moisture, chemical composition and the like, and means for supplying heated air from the space between the retort and the outer casing to the circulating medium while a portion thereof is being discharged.

8. An apparatus of the class described including an outer casing, an inner retort spaced from the outer casing, one or more ducts extending beneath the retort and communicating with the interior thereof at opposite sides of the same, means for circulating a heating and drying medium through the retort and the said ducts to provide a continuous circulation of the same, means for discharging a portion of the circulating medium from the said duct and means for supplying dry heated air from the space between the retort and the outer casing to the circulating medium.

9. An apparatus of the class described including an outer casing having air inlet openings, a metallic retort arranged within the casing in spaced relation with the same, bottom ducts located beneath the retort and connected with the same at opposite sides thereof for providing a continuous circulation through the retort, and a blower arranged at one side of the retort for positively causing a circulation through the retort and the said ducts.

10. An apparatus of the class described including an outer casing having air inlet openings, a metallic retort arranged within the casing in spaced relation with the same, bottom ducts located beneath the retort and connected with the same at opposite sides thereof for providing a continuous circulation through the retort, a blower arranged at one side of the retort for positively causing a circulation through the retort and the said ducts, and valves located at the ducts and at the space adjacent the blower and between the retort and the outer casing for controlling the discharge of the circulating medium and for admitting dry heated air to the same.

11. An apparatus of the class described including an outer casing, a metallic retort arranged within the outer casing in spaced relation with the same, a bottom duct located beneath the retort and communicating therewith at opposite sides thereof, a blower for forcing a circulating medium through the ducts and the retort to provide a continuous circulation of the medium, and a radiator located adjacent to the blower for raising and maintaining the circulation of the said medium as the same leaves the retort and passes to the lower return ducts.

12. An apparatus of the class described including an outer casting, an inner retort arranged in spaced relation with the same, and provided at one side with openings, ducts located beneath the retort and communicating therewith at opposite sides thereof, radiators located at the said openings for raising and maintaining the temperature of a circulating medium as the same leaves the retort, and blowers arranged at the said openings for drawing the circulating medium through the retort and for driving the same through the said ducts.

13. An apparatus of the class described including an outer casing, an inner retort arranged in spaced relation with the same, and provided at one side with openings, ducts located beneath the retort and communicating therewith at opposite sides thereof, radiators located at the said openings for raising and maintaining the temperature of a circulating medium as the same leaves the retort, and blowers arranged at the said openings for drawing the circulating medium through the retort and radiator and for driving the same through the said ducts, and means for controlling the discharge of the circulating medium from the duct to exhaust a portion of the said medium, and means for controlling the admission of dry heated air to the said medium from the space or spaces between the retort and the outer casing.

14. The herein described process of drying and treating material which consists in subjecting the material while in a retort to the action of a continuously forced circulating medium consisting first of steam and then of hot air which makes its complete circuit within the retort, exhausting a complete lower stratum of the circulating medium, to remove moisture from the material, and reheating the circulating medium within the retort after passage of the circulating medium through the material.

15. The herein described process of drying and treating material which consists in subjecting the material while in a retort to the action of a continuously forced circulating medium consisting first of steam and then of hot air which makes its complete circuit within the retort, exhausting a complete lower stratum of the circulating medium and discharging the said exhausted portion to remove moisture from the material, adding to the circulating medium dry preheated air to take the place of the discharged portion of the circulating medium, and reheating the circulating medium within the retort after passage of the circulating medium through the material.

16. The herein described process of drying and treating material which consists in subjecting the material while in a retort to the action of a continuously forced circulating current of steam for a period, then subjecting the material to the action of a continuously circulating current of hot air, causing the hot air to pass horizontally through the material from one side of the retort to the other side thereof and downward at the said other side to the bottom of the retort and to return beneath the material, exhausting a complete lower stratum of the current of hot air to remove moisture therefrom, adding to the current of hot air dry heated air to take the place of the exhausted portion and finally subjecting the material to the action of a continuous circulating current of air to cool the material gradually to normal temperature.

17. In an apparatus of the class described, including an outer casing, an inner retort arranged in spaced relation with the outer casing, means for supporting the material to be dried in the retort and for providing passages through the material, means for passing a drying and heating medium through the material and for returning the medium exteriorly of the said passages to produce a circulation of the said medium within the outer casing, means for exhausting a portion of the circulating medium to remove moisture from the material, means for controlling the passage of the medium through the material, and means for heating the circulating medium within the retort.

18. In an apparatus of the class described, including an outer casing, an inner retort arranged in spaced relation with the outer casing, means for supporting the material to be dried in the retort and for providing passages through the material, means for passing a drying and heating medium through the passages of material and for returning the medium exteriorly of the said passages to produce a continuous circulation of the said medium, means for exhausting a portion of the medium to remove moisture from the material, and means for closing certain of the passages through the material while permitting the circulating medium to pass through other passages of the material.

19. In an apparatus of the class described, including an outer casing, an inner retort arranged in spaced relation with the outer casing, means for supporting the material to be dried in the retort and for providing passages through the material, means for passing a drying and heating medium through the passages of the material and for returning the medium exteriorly of the said passages to produce a continuous circulation of the said medium, and doors arranged to close any of the passages of the material for controlling the heating and drying of the same.

20. In an apparatus of the class described, including an outer casing, an inner retort arranged in spaced relation with the outer casing, means for supporting the material to be dried in the retort and for providing passages through the material, means for passing a drying and heating medium through the passages of the material and for returning the medium exteriorly of the said passages to produce a continuous circulation of the said medium, and vertical doors arranged at intervals and adapted to close the passages through the material.

21. In an apparatus of the class described, including an outer casing, an inner retort arranged in spaced relation with the outer casing, means for supporting the material to be dried in the retort and for providing passages through the material, means for passing a drying and heating medium through the passages of the material and for returning the medium exteriorly of the said passages to produce a continuous circulation of the said medium, and vertical doors arranged in pairs throughout the length of the material and at the ends of the same for controlling the passage of the circulating medium through the material and around the ends of the same.

In testimony whereof I have hereunto set my hand.

HENRY CLAY BABEL.